United States Patent
Hyttinen et al.

(10) Patent No.: US 8,064,396 B2
(45) Date of Patent: Nov. 22, 2011

(54) COMMUNICATION METHOD AND A RADIO SYSTEM

(75) Inventors: Keijo Hyttinen, Kajaani (FI); Ville Rautiainen, Kajaani (FI)

(73) Assignee: Elektrobit Wireless Communications Oy, Oulu (FI)

( * ) Notice: Subject to any disclaimer, the term of this patent is extended or adjusted under 35 U.S.C. 154(b) by 431 days.

(21) Appl. No.: 12/111,439

(22) Filed: Apr. 29, 2008

(65) Prior Publication Data

US 2009/0268625 A1    Oct. 29, 2009

(51) Int. Cl.
  *H04J 1/16* (2006.01)
(52) U.S. Cl. .................................. 370/329; 370/431
(58) Field of Classification Search .......... 370/310–350, 370/431–463
  See application file for complete search history.

(56) References Cited

U.S. PATENT DOCUMENTS

| | | | | |
|---|---|---|---|---|
| 2004/0095907 A1* | 5/2004 | Agee et al. | ................. | 370/334 |
| 2004/0203392 A1* | 10/2004 | Hsu et al. | ................. | 455/62 |
| 2004/0228283 A1 | 11/2004 | Naguib et al. | | |
| 2007/0121547 A1 | 5/2007 | Huh et al. | | |
| 2007/0263653 A1 | 11/2007 | Hassan et al. | | |

FOREIGN PATENT DOCUMENTS

| | | |
|---|---|---|
| EP | 1653694 A2 | 5/2006 |
| EP | 1895676 A1 | 3/2008 |
| EP | 2068466 A1 | 6/2009 |
| WO | WO2008041291 A1 | 4/2008 |

\* cited by examiner

*Primary Examiner* — Hassan Kizou
*Assistant Examiner* — Ashil Farahmand
(74) *Attorney, Agent, or Firm* — Hoffmann & Baron, LLP

(57) ABSTRACT

The network system of an orthogonal frequency division multiplexing radio system measures a quality of a signal from a user terminal. At least one compared property of the signal is compared with a predetermined threshold. The comparison includes a comparison involving the measured quality. A number of sub-channels for the user terminal is decreased if each comparison operation indicates that a compared property is at the predetermined threshold or within a predetermined range of the threshold. A control signal about a decrease is transmitted to the user terminal. The user terminal transmits with the decreased number of sub-channels as a response to the control signal.

19 Claims, 4 Drawing Sheets

COMMUNICATION METHOD AND A RADIO SYSTEM

BACKGROUND OF THE INVENTION

1. Field of the Invention

The invention relates to communication in a orthogonal frequency division multiple access radio system.

2. Description of the Related Art

Radio systems such as a WiMAX (Worldwide Interoperability for Microwave Access) or a WLAN (Wireless Local Area Network) system may utilize an OFDMA (Orthogonal Frequency Division Multiple Access) technique where symbols to be transmitted are mapped to sub-carriers. The sub-carriers, in turn, are grouped to form sub-channels. In uplink, a time slot may have a width of three symbols and it may comprise 48 data sub-carriers, for example. A time slot also comprises pilot carriers which carry predetermined symbols for reference in the reception.

When the quality of a received signal begins to drop below an acceptable level although a user terminal is transmitting at its maximum transmission power and using the most robust encoding and modulation, failures start to appear in the reception of data packets. To be able to continue the communication, a process of re-transmission of improperly received data packets is started. After one or more re-transmissions data packets may be received without errors.

However, the re-transmission process consumes a lot of resources in the radio system. That also leads to lowered data rates and to a deteriorated service.

SUMMARY OF THE INVENTION

An object of the invention is to provide an improved method. According to an aspect of the invention, there is provided a communication method of an orthogonal frequency division multiple access radio system, the method comprising measuring, in a network system, a quality of a received signal transmitted by a user terminal; performing at least one comparison operation such that at least one compared property of the received signal is compared with a predetermined threshold, the at least one comparison operation including a comparison operation with the measured quality; and decreasing the number of sub-channels for a transmission of the user terminal if each comparison operation indicates that a compared property is at the predetermined threshold or within a predetermined range of the threshold.

According to another aspect of the invention, there is provided a communication method of an orthogonal frequency division multiple access radio system, wherein the number of sub-channels for a transmission of a user terminal has been decreased, the method comprising increasing the number of sub-channels for a transmission of a user terminal, if the transmission power of the signal is other than the maximum, for canceling at least partly the limitation concerning the number of sub-channels.

According to another aspect of the invention, there is provided a communication method of an orthogonal frequency division multiple access radio system, wherein the number of sub-channels for a transmission of a user terminal has been set to a decreased level, the method comprising increasing the number of sub-channels for a transmission of a user terminal if the protection against interference of the signal differs from the maximum for canceling at least partly the limitation concerning the number of the sub-channels.

According to another aspect of the invention, there is provided an orthogonal frequency division multiple access radio system, the radio system comprising a network system and a user terminal; the network system being configured to measure a quality of a received signal transmitted by a user terminal; compare at least one compared property of the received signal with a predetermined threshold, the at least one compared property being the measured quality; decrease the number of sub-channels for a transmission of the user terminal if each comparison indicates that the measured quality is at the predetermined threshold or within a predetermined range of the threshold; transmit a control signal to the user terminal about a decrease in the number of sub-channels for the transmission of the user terminal; the user terminal being configured to transmit with the decreased number of sub-channels in response to the control signal.

According to another aspect of the invention, there is provided an orthogonal frequency division multiple access radio system, the radio system comprising a network system and a user terminal, wherein the radio system is in a state where the number of sub-channels for a transmission of the user terminal has been decreased by the network system, the network system being configured to increase the number of sub-channels for a transmission of the user terminal if the transmission power of the signal is other than the maximum for canceling at least partly the limitation concerning the number of the sub-channels.

According to another aspect of the invention, there is provided an orthogonal frequency division multiple access radio system, the radio system comprising a network system and a user terminal, wherein the radio system is in a state where the number of sub-channels for a transmission of the user terminal has been decreased by the network system, the network system being configured to increase the number of sub-channels for a transmission of the user terminal if the protection against interference of the signal is other than the maximum for canceling at least partly the limitation concerning the number of the sub-channels.

According to another aspect of the invention, there is provided a network element in an orthogonal frequency division multiple access radio system, the network element comprising a meter configured to measure a quality of a received signal transmitted by a user terminal and to perform at least one comparison operation including a comparison operation with the measured quality; an allocator of radio resources configured to decrease the number of sub-channels for a transmission of the user terminal if each comparison results in a value at a predetermined threshold or in a predetermined range; the network element being configured to transmit a control signal to the user terminal about a decrease in the number of sub-channels for the transmission of the user terminal.

According to another aspect of the invention, there is provided a user terminal of an orthogonal frequency division multiple access radio system, the user terminal comprising a converter; and the user terminal configured to receive a control signal from a network system of the radio system about a decrease in the number of sub-channels for a transmission of the user terminal; and the converter in the user terminal being configured to decrease the number of sub-channels for the transmission in response to the control signal; and the user terminal being configured to transmit with the decreased number of sub-channels.

The invention provides several advantages. The need for retransmissions decreases which results in better data rates and service.

BRIEF DESCRIPTION OF THE DRAWINGS

In the following, the invention will be described in greater detail with reference to the embodiments and the accompanying drawings, in which.

DETAILED DESCRIPTION OF THE PREFERRED EMBODIMENTS

Figure 1:
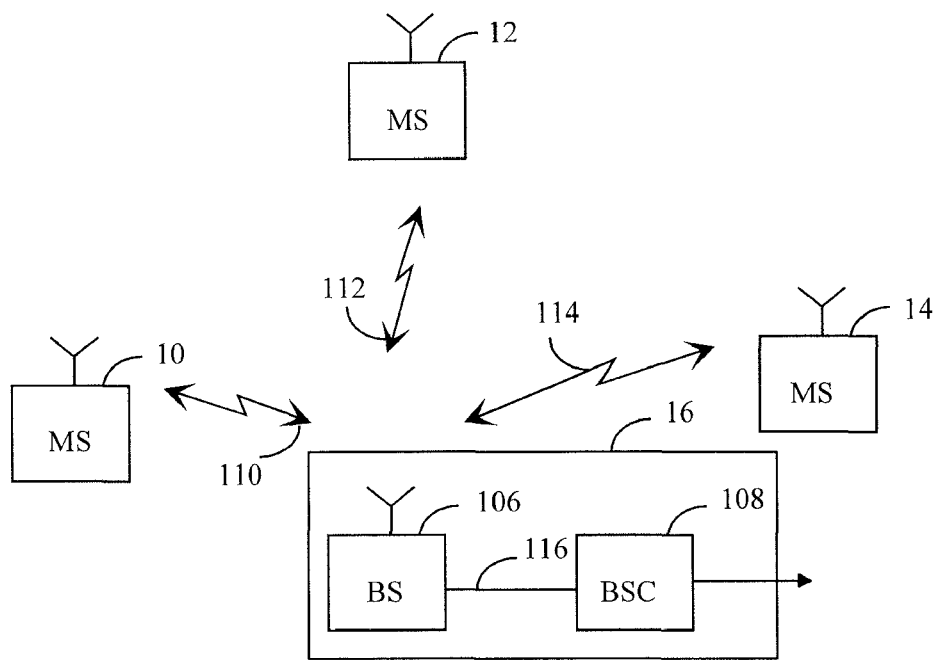
FIG. 1 shows a radio system.

A digital radio system, shown in FIG. 1, may comprise user terminals 10 to 14, and a network system 16 including at least one base station 106, and a base station controller 108. The user terminals 10 to 14 may communicate wirelessly with the base station 106 using signals 110 to 114. The base station 106 may be controlled by the base station controller 108 and they may communicate through a digital transmission link 116. The user terminals 10 to 14 may be stationary, installed in a vehicle or portable mobile terminals. The signals 110 to 114 between the user terminals 10 to 14 and the network system 16 carry digitized information, which is for example speech, images, videos, or data information produced by subscribers, or control information produced by the radio system.

In a radio system, signals of different users may be transmitted at different moments of time such that each burst takes place in a specific time slot. An OFDMA (Orthogonal Frequency division multiple access) scheme with or without a (W)CDMA ((Wide band) Code Division Multiple Access) technique may also be used for communication between the base station and the user terminal. In the OFDMA technique, data is transmitted using sub-channels built up of a plurality of sub-carriers. The radio system may be, for instance, a WiMAX (Worldwide Interoperability for Microwave Access) radio system or a WLAN (Wireless Local Area Network) radio system.

In an embodiment, the quality of a received signal 110 to 114 transmitted by a user terminal 10 may be measured in the network system 16. The measurement may be performed in the base station 106, the base station controller 108 or elsewhere in the network system 16. The quality may be measured, for example, as CINR (Carrier to Interference-plus-Noise Ratio), SIR (Signal-to-Interference Ratio), BER (Bit Error Rate), PER (Packet Error Rate), BLER (BLock Error Rate), etc.

The measured quality may be compared with a predetermined threshold in the network system 16. The predetermined threshold may be a single value or a range limited by an upper or a lower limit. The predetermined threshold may also be limited by an upper and a lower limit. The predetermined threshold may also be adaptive. The predetermined threshold may change due to variations in conditions of wireless connections. The reason for the variations may be weather, landscape changes, etc.

In general, the network system 16 may decrease or limit the number of sub-channels to be used by the user terminal 10 to 14 for transmission if the quality of the received signal is at the predetermined threshold or within a predetermined range of the predetermined threshold. The condition is fulfilled if the quality of the received signal is at or below the predetermined threshold.

Figure 2:
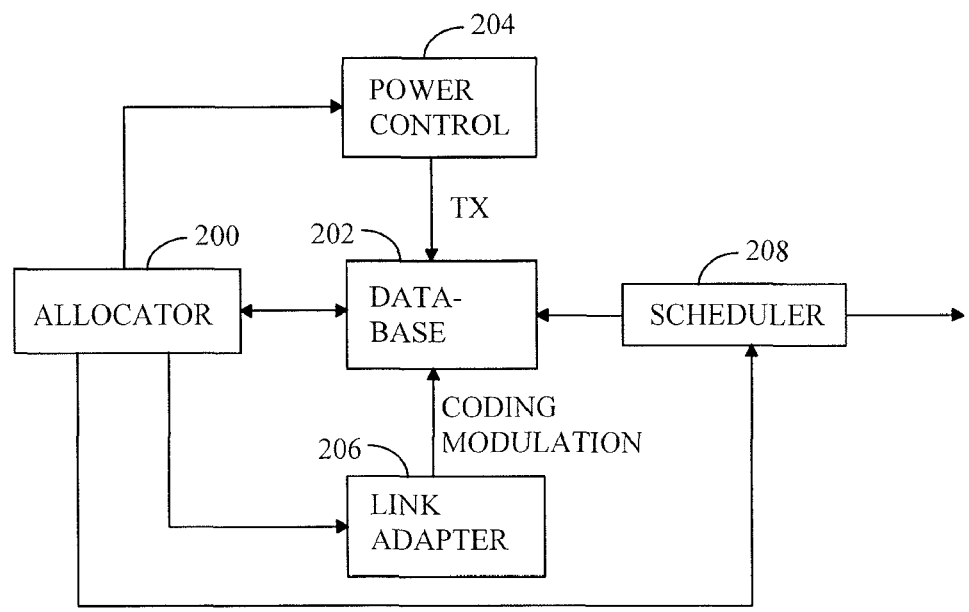
FIG. 2 illustrates a system controlling the number of sub-channels.

The control of the number of sub-channels may still be made more sophisticated and the decrease in the usable number of sub-channels may additionally depend on at least one additional feature. FIG. 2 illustrates an example of a system for modifying the number of sub-channels for the transmission of the user terminal 10 to 14. An allocator 200 of radio resources of the network system 16 may receive information on the transmission power of the received signal. The information on the transmission power of a user terminal 10 to 14 may be stored in a data-base 202 by a power control 204 and it may be retrieved therefrom for comparison. The data-base 202 and the power control 204 may reside in the network system 16. The transmission power may then be retrieved and compared with a predetermined threshold in the allocator 200. The allocator 200 of the network system 16 may then decrease the allocated number of sub-channels if the transmission power is at maximum or within a predetermined range of the maximum.

Additionally, the allocator 200 in the network system 16 may receive information on protection against interference of the received signal, for example, from the data-base 202. Information on the protection against interference may have been stored in the data-base 202 by a link adapter 206 and the information on the protection against interference may be retrieved for comparison. The protection against interference may then be compared with a predetermined threshold in the allocator 200 of the network system 16. The allocator 200 may then decrease the allocated number of sub-channels if the protection against interference is at the maximum or within a predetermined range of the maximum.

In general, the predetermined range may have either a predetermined upper limit or a predetermined lower limit. The predetermined range may also have both a predetermined upper limit and a predetermined lower limit. That is, the predetermined range is predetermined if it has a predetermined numerical value for at least one limit.

The allocator 200 may transmit a control signal for a controller 208 in the user terminal 10 to 14 and the controller 208 may decrease the number of usable sub-channels in response to the signal commanding the decrease.

The level of protection against interference depends, for example, on the robustness of encoding and modulation performed by the user terminal to the transmitted signal. The user terminal 10 may adaptively use, for example, LDPC coding (Low-Density Parity Check), convolution coding or turbo coding. In the encoding, the more redundancy the method involves, the more robust it is. Of these three, turbo coding is the most robust and hence gives the best protection against interference. Additionally, the level of protection against interference depends on a coding rate, such as $\frac{1}{2}$, $\frac{3}{4}$, $\frac{5}{6}$. A person skilled in the art is, per se, capable of putting in order different coding methods according to their robustness.

As an example of modulation, the user terminal 10 may adaptively use BPSK (Binary Phase Shift Keying), QPSK (Quadrature Phase Shift Keying), 16QAM (Quadrature Amplitude Modulation) or 64QAM. In the modulation, the more simple the method is, the more robust it is. Of these three, the most robust is BPSK and hence gives the best protection against interference.

The decrease in the number of sub-channels may be absolute or relative. Each time the network system 16 allocates a decreased number of usable sub-channels for a user terminal 10 to 14 the network system 16 may decrease the number of usable sub-channels by one. In general, the network system 16 may decrease the number of usable sub-channels by a predetermined positive integer.

In a relative decrease, the network system 16 may decrease the number of usable sub-channels by dividing the number of sub-channels of the received signal by a predetermined number. The number may be an integer which makes the division produce an integer for the number of sub-channels. The predetermined number may have a relation to the usable transmission power or a power reserve of a user terminal 10 to 14. The smaller the number of sub-channels, the higher the power in each sub-channel and the more easily a base station can detect a signal from the sub-channels. The predetermined number may also be a real number, but then the result of the division may have to be rounded somehow to provide an integer. In an embodiment, the network system may divide the number of sub-channels of the received signal by two which provides about an increase of about 3 dB in transmission power per sub-channel.

The radio system may be in a state where the number of sub-channels for a transmission of a user terminal 10 to 14 has previously been limited by the network system 16. The network system 16 may then increase the number of usable sub-channels for the transmission of the user terminal 10 to 14 if the transmission power of the signal is other than the maximum or outside a predetermined range of the maximum. The increase may cancel at least partly the previous decrease in the number of sub-channels.

In a similar way, the radio system may be in a state where the number of usable sub-channels for a transmission of the user terminal has previously been decreased by the network system. The network system 16 may increase the number of usable sub-channels for a transmission of the user terminal 10 to 14 if the protection against interference of the signal is other than the maximum. The increase may cancel at least partly the limitation in the number of sub-channels.

Figure 3:
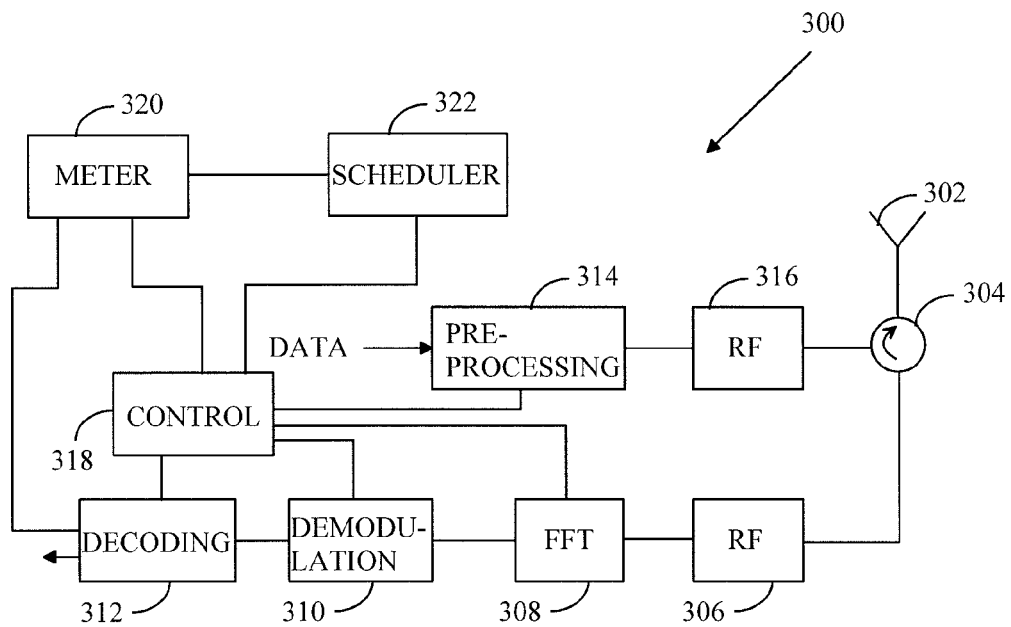
FIG. 3 illustrates a network element.

FIG. 3 presents a network element 300 in the network system 16. The network element 300 may be a base station 106 with or without a base station controller 108. The network element 300 comprises an antenna 302 for transmitting and receiving signals. A received RF (Radio Frequency) signal propagates to a circulator 304 which forwards the RF signal to a mixer 306. The mixer 306 mixes the RF signal to a base-band frequency and feeds the signal to a converter 308 which performs an FF (Fast Fourier) transform to the signal. The transform recovers symbols from the OFDMA form of the sub-carriers of the sub-channel structure. The symbols may then be demodulated in a demodulator 310 and decoded in a decoder 312.

The network element 300 may also transmit signals. Data to be transmitted may be processed in a pre-processor 314 which may encode the data and the encoded data may be modulated. Additionally, the modulated data may be converted, for example, to an OFDMA form. The signal from the pre-processor 314 is mixed in a mixer 316 into an RF signal, and the circulator 304 forwards the RF signal to the antenna 302 to be transmitted as electromagnetic radiation.

The network element 300 may further include a controller 318 which may control the operation of at least one block of the network element 300.

The network element 300 may comprise a meter 320 for measuring the quality of a received signal transmitted by a user terminal 10 to 14. The meter 320 may also compare the measured quality with a reference quality, i.e., a predetermined threshold. The predetermined threshold may be adaptive such that a repetition of data transmission can be avoided. The predetermined threshold may be set in the base station.

The meter 320 may feed the information to the controller 318, and a scheduler 322 in the controller 318 may allocate a number of sub-channels, which is smaller than the number of sub-channels for the received signal, for a transmission of the user terminal if the quality of the received signal is at or below the predetermined threshold. The network element 300 may then transmit a control signal to the user terminal 10 to 14 about the decrease in the number of usable sub-channels for the user terminal 10 to 14. The network element 300 may also include information on the allocated sub-channels for the transmission of the user terminal in the signal. The scheduler 322 may reside in a base station 106, in a base station controller 108 or in some other part of the network system 16.

Figure 4:
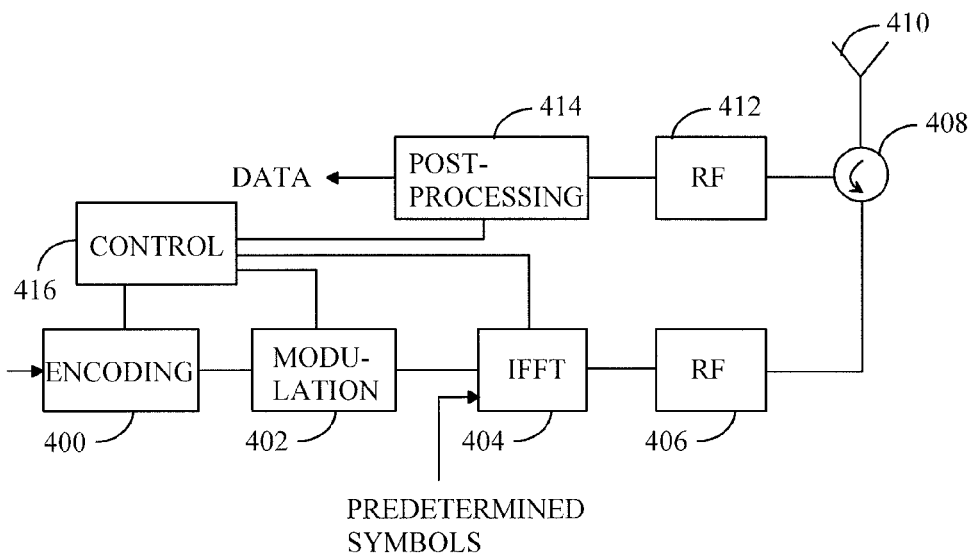
FIG. 4 shows a user terminal.

FIG. 4 presents a user terminal 10 to 14. The data to be transmitted may be encoded in an encoder 400 which may encode the signal using, for example, FEC (Forward Error Coding), Solomon-Reed coding, convolutional coding, a turbo coding. After encoding the signal may be modulated in a modulator 402 which may use, for example, QPSK, BPSK, 16QAM, 64QAM modulations. The decoded and modulated signal comprising symbols is then fed to a converter 404 which performs an IFF (Inverse Fourier Fast) transform to the signal. Pilot signals which comprise predetermined symbols are also fed to the IFF converter 404. In the transform the symbols are distributed to sub-carriers of the sub-channels and results in an OFDMA signal. The OFDMA signal propagates to an RF mixer 406 which mixes the OFDMA signal into an RF signal. A circulator 408 passes the RF signal to an antenna 410 for transmitting the signal forward as electromagnetic radiation.

The user terminal 10 to 14 may also receive electromagnetic radiation. An RF signal may be received by the antenna 410 which feeds it to the circulator 408. The circulator 408 forwards the RF signal to an RF mixer 412 which mixes the RF signal to a base-band signal. The base-band signal may be an OFDMA signal. The base-band signal is further fed to a post-processor 414 which may include an inverse converter to inverse, for example, the possible IFF transform made by the transmitter, such as the network element 300. The post-processor 414 may also include a demodulator and a decoder for processing the modulation and the encoding of the signal. The user terminal 10 to 14 may further include a controller 416 which may control the operation of at least one block of the user terminal.

The user terminal 10 to 14 may receive a control signal from the network system 16 of the radio system wherein the control signal may include information concerning a decrease, a limit or a decrease limitation in the number of sub-channels for a transmission of the user terminal. The control signal may also include information on allocated sub-channels. The controller 416 of the user terminal may control the converter 404 such that the converter 404 decreases the number of sub-channels for the transmission in response to the control signal. The user terminal 10 to 14 may then transmit with the decreased number of sub-channels or within the decreased number of sub-channels. For example, before decreasing the number of sub-channels, the user terminal may transmit using up to four sub-channels, but after the decrease the user terminal may transmit using only up to two sub-channels. The exceeding sub-channels may now be allocated for some other user terminal such that the over-all service in the radio system remains at least at the original level or becomes better.

Figure 5:
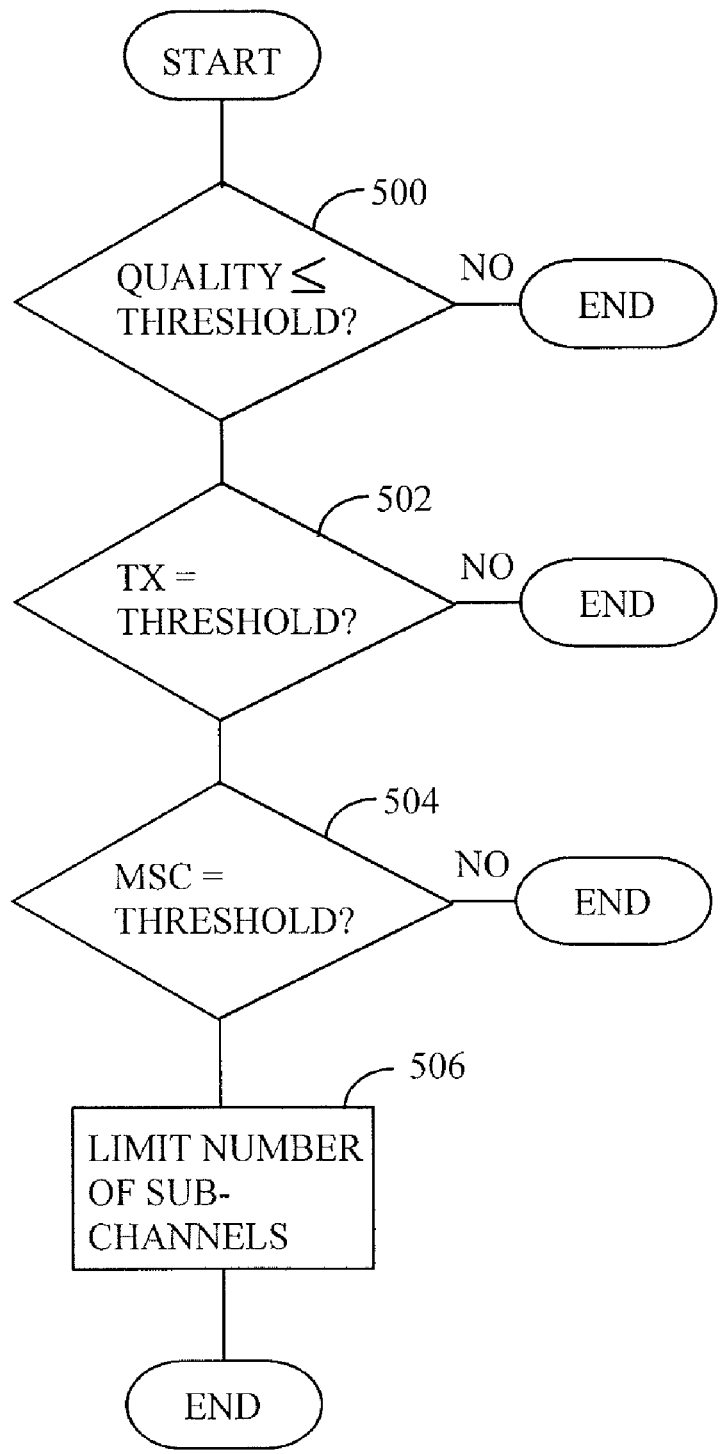
FIG. 5 shows a flow chart of a method to decrease the number of sub-channels.

FIG. 5 shows a flow chart of the method to decrease the number of usable sub-channels. In step 500, the quality of a received signal transmitted by a user terminal 10 to 14 is measured and at least one comparison operation including comparing the measured quality with a predetermined threshold is performed in a network system 16. If the quality of the received signal is at or below the predetermined threshold the next step of the method is performed. Otherwise, the method ends.

In step 502, the transmission power of the received signal is compared with a predetermined range or a value. If the transmission power is at maximum or within a predetermined range of the maximum power, the next step is performed. Otherwise, the method ends.

In step 504, protection against interference is compared with a predetermined range or a value. If the protection against interference is at maximum or within a predetermined range of the maximum, the next step is performed. Otherwise, the method goes to an end.

In step 506, the number of sub-channels is decreased. If the number of sub-channels is the same as the threshold minimum (such as one), the user terminal 10 to 14 may not decrease the number of sub-channels any longer.

Each time the method ends, the method may start again.

Figure 6:
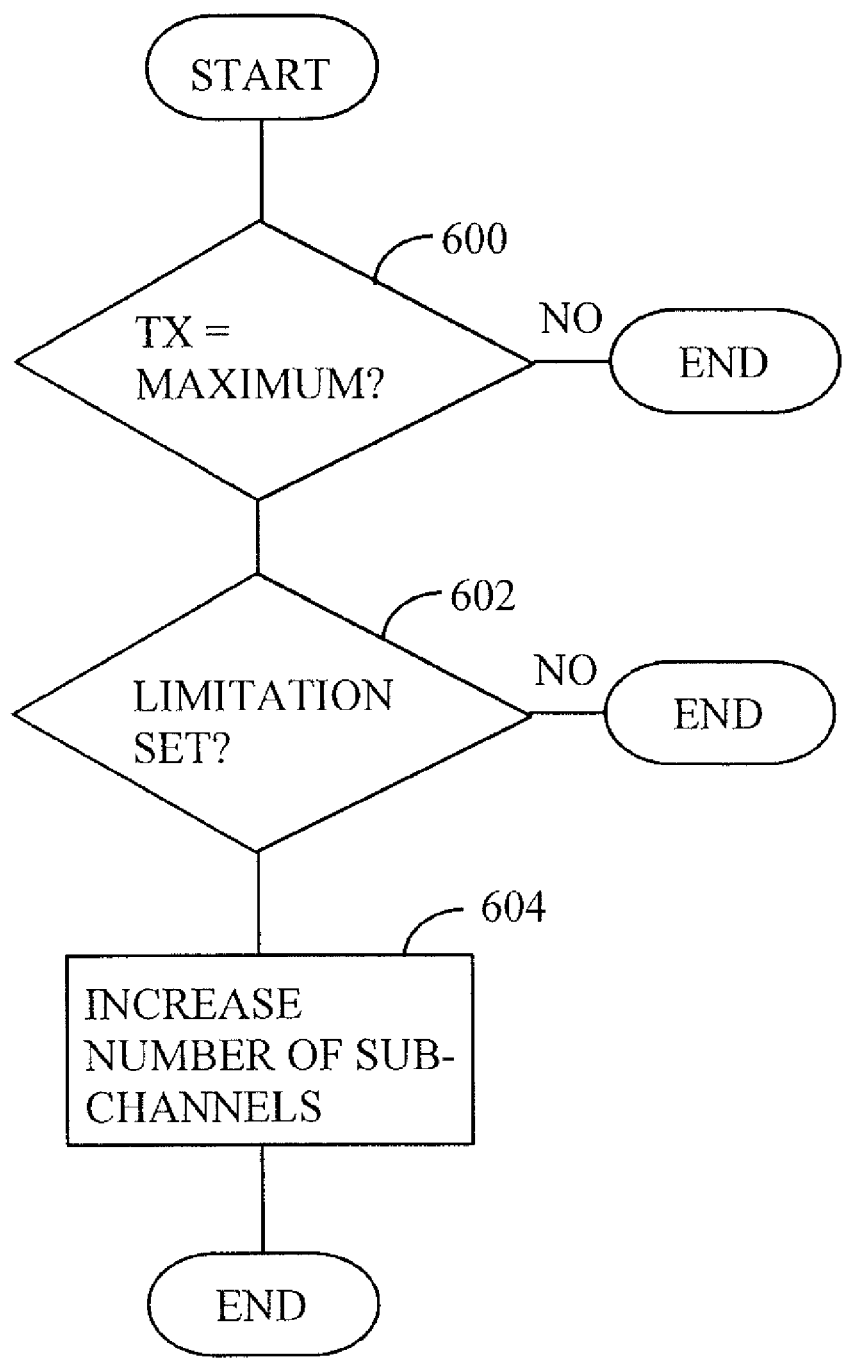
FIG. 6 shows a flow chart of a method to increase the number of sub-channels.

FIG. 6 presents a flow chart of the method to increase the number of usable sub-channels. In step 600, a transmission power of the received signal is compared with a predetermined range. If the transmission power is not in the predetermined range starting from the maximum, the next step is performed. Otherwise, the method ends. The predetermined range may be, for example, 1 to 4 dB, without being limited to these values.

In step 602, it is checked whether the number of sub-channels has been decreased. If the number of sub-channels has been decreased, the next step is performed. Otherwise, the method ends.

In step 604, the number of sub-channels is increased.

A computer system may be configured to perform at least some of the steps described in connection with the flowcharts of FIG. 5 and FIG. 6. The embodiments may be implemented as a computer program comprising instructions for executing a computer process for a communication method of an orthogonal frequency division multiple access radio system.

The computer program may be stored on a computer program distribution medium readable by a computer or a processor. The computer program medium may be, for example but is not limited to, an electric, magnetic, optical, infrared, or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but can be modified in several ways within the scope of the appended claims.

What is claimed is:

1. A communication method of an orthogonal frequency division multiple access radio system, the method comprising:
    measuring, in a network system, a quality of a received signal transmitted by a user terminal, the measured quality is a transmission power of the received signal;
    performing at least two comparison operations, thereby comparing at least one property of the received signal with a predetermined threshold, the at least two comparison operations including a comparison operation between the measured quality and the predetermined threshold;
    comparing protection against interference of the received signal with a maximum protection, the protection against interference comprising at least one of robustness of encoding and modulation of the received signal performed by the user terminal;
    decreasing the number of sub-channels for a transmission of the user terminal if each comparison operation indicates that a compared property is at the predetermined threshold or within a predetermined range of the threshold and if the protection against interference is at the maximum protection or within a predetermined range of the maximum protection; and
    increasing the number of sub-channels for a transmission of a user terminal in response to the number of sub-channels for a transmission of a user terminal having been decreased and the transmission power of the signal being outside a predetermined range of the maximum, thereby canceling at least partly the limitation concerning the number of sub-channels.

2. The method of claim 1, the method further comprising comparing the measured quality with a predetermined threshold, and decreasing the number of sub-channels if the comparison operation indicates that the measured quality is at or below the predetermined threshold.

3. The method of claim 1, the method further comprising comparing a transmission power of the received signal with the maximum transmission power of the user terminal and decreasing the number of sub-channels if the transmission power is at maximum or within a predetermined range of the maximum power.

4. The method of claim 1, the method further comprising performing the protection against interference by encoding and modulation, the robustness of them defining the level of the protection.

5. The method of claim 1, the method further comprising measuring the quality as a carrier-to-interference-plus-noise ratio.

6. The method of claim 1, the method further comprising decreasing the number of sub-channels by at least one.

7. The method of claim 1, the method further comprising decreasing the number of sub-channels by dividing the number of sub-channels of the received signal by a predetermined number.

8. The method of claim 7, the method further comprising dividing the number of sub-channels of the received signal by two.

9. The method of claim 1, wherein the number of sub-channels for a transmission of a user terminal has been set to a decreased level and the measured quality is a protection against interference of the signal, the method further comprising
    increasing the number of sub-channels for a transmission of a user terminal if the protection against interference of the signal differs from the maximum for canceling at least partly the limitation concerning the number of the sub-channels.

10. An orthogonal frequency division multiple access radio system, the radio system comprising:
    a network system; and a user terminal,
    the network system being configured to:
    measure a quality of a received signal transmitted by a user terminal, the measured quality is a transmission power of the received signal;

compare at least one property of the received signal with a predetermined threshold, the at least one property being the measured quality;

compare protection against interference of the received signal with a maximum protection, the protection against interference comprising at least one of robustness of encoding and modulation of the received signal performed by the user terminal;

decrease the number of sub-channels for a transmission of the user terminal if each comparison indicates that the measured quality is at the predetermined threshold or within a predetermined range of the threshold and if protection against interference is at the maximum protection or within a predetermined range of the maximum protection for the signal;

transmit a control signal to the user terminal about a decrease in the number of sub-channels for the transmission of the user terminal, the user terminal being configured to transmit with the decreased number of sub-channels in response to the control signal; and increase the number of sub-channels for a transmission of the user terminal in response to the number of sub-channels for a transmission of a user terminal having been decreased and the transmission power of the signal being outside a predetermined range of the maximum, thereby canceling at least partly the limitation concerning the number of the sub-channels.

11. The radio system of claim 10, wherein the network system is configured to compare the measured quality with a predetermined threshold and to decrease the number of sub-channels if the comparison operation indicates that the measured quality is at or below the predetermined threshold.

12. The radio system of claim 10, wherein the network system is configured to compare a transmission power of the received signal with the maximum transmission power of the user terminal and to decrease the number of sub-channels if the transmission power is at maximum or within a predetermined range of the maximum power.

13. The radio system of claim 10, wherein the user terminal is configured to perform the protection against interference by encoding and modulation, their robustness defining the level of the protection.

14. The radio system of claim 10, wherein the network system is configured to measure the quality as a carrier-to-interference-plus-noise ratio.

15. The radio system of claim 10, wherein the network system is configured to decrease the number of sub-channels by at least one.

16. The radio system of claim 10, wherein the network system is configured to decrease the number of sub-channels by dividing the number of sub-channels of the received signal by a predetermined number.

17. The radio system of claim 16, wherein the network system is configured to divide the number of sub-channels of the received signal by two.

18. The radio system of claim 10, wherein the radio system is in a state where the number of sub-channels for a transmission of the user terminal has been decreased by the network system and the measured quality is a protection against interference of the signal, the network system is configured to increase the number of sub-channels for a transmission of the user terminal if the protection against interference of the signal is other than the maximum for canceling at least partly the limitation concerning the number of the sub-channels.

19. A network element in an orthogonal frequency division multiple access radio system, the network element comprising:

a meter configured to measure a quality of a received signal transmitted by a user terminal and to perform at least two comparison operations, thereby comparing at least one property of the received signal with a predetermined threshold, the at least two comparison operations including a comparison operation between the measured quality and a predetermined threshold, and a comparison of protection against interference of the received signal with a maximum protection, the protection against interference comprising at least one of robustness of encoding and modulation of the received signal performed by the user terminal, the measured quality being a transmission power of the received signal; and an allocator of radio resources configured to decrease the number of sub-channels for a transmission of the user terminal if each comparison operation indicates that a compared property is at the predetermined threshold or in a predetermined range of the threshold and if protection against interference is at the maximum protection or within a predetermined range of the maximum protection, the network element being configured to transmit a control signal to the user terminal about a decrease in the number of sub-channels for the transmission of the user terminal;

the allocator of radio resources being configured to increase the number of sub-channels for a transmission of the user terminal in response to the number of sub-channels for a transmission of a user terminal having been decreased and the transmission power of the signal being outside a predetermined range of the maximum, thereby canceling at least partly the limitation concerning the number of the sub-channels.

* * * * *